(12) United States Patent
Wågberg et al.

(10) Patent No.: US 9,108,617 B2
(45) Date of Patent: Aug. 18, 2015

(54) METHOD AND SYSTEM FOR CONTROL OF A CLUTCH AT A VEHICLE

(71) Applicant: SCANIA CV AB, Södertälje (SE)

(72) Inventors: Mikael Wågberg, Södertälje (SE); Mats Liwell, Södertälje (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/368,866

(22) PCT Filed: Dec. 19, 2012

(86) PCT No.: PCT/SE2012/051431
§ 371 (c)(1),
(2) Date: Jun. 26, 2014

(87) PCT Pub. No.: WO2013/100843
PCT Pub. Date: Jul. 4, 2013

(65) Prior Publication Data
US 2014/0378276 A1    Dec. 25, 2014

(30) Foreign Application Priority Data

Dec. 28, 2011   (SE) ........................................ 1151280
Dec. 19, 2012   (SE) ........................................ 1251463

(51) Int. Cl.
*B60W 10/02*    (2006.01)
*F16D 48/08*    (2006.01)
*B60W 10/06*    (2006.01)

(52) U.S. Cl.
CPC ............... *B60W 10/02* (2013.01); *B60W 10/06* (2013.01); *F16D 48/08* (2013.01); *B60W 2540/10* (2013.01); *F16D 2500/30401* (2013.01); *F16D 2500/30421* (2013.01);
(Continued)

(58) Field of Classification Search
None
See application file for complete search history.

(56) References Cited

U.S. PATENT DOCUMENTS 7,769,517 B2 *   8/2010   Segawa et al. .................. 701/68
8,092,339 B2 *   1/2012   Heap et al. ........................ 477/5
8,260,513 B2 *   9/2012   Shelton et al. .................. 701/68
(Continued)

FOREIGN PATENT DOCUMENTS

EP   0 707 998 A2   4/1996
EP   1 225 362 A2   7/2002
(Continued)

OTHER PUBLICATIONS

International Search Report dated Mar. 19, 2013 issued in corresponding International application No. PCT/SE2012/051431.

*Primary Examiner* — Dirk Wright
(74) *Attorney, Agent, or Firm* — Ostrolenk Faber LLP

(57) ABSTRACT

A method for controlling a clutch which pertains to a vehicle and which is operated by means of a vehicle control system. The vehicle is provided with an engine, and a driver of the vehicle requests propulsive force from the engine. A first propulsive force requested by the driver and transmitted via a clutch involves determining whether the clutch slips while transmitting the first propulsive force. When the clutch slips during transmission of the first propulsive force, the propulsive force transmitted by the clutch increases. The invention relates also to a system and a vehicle.

32 Claims, 4 Drawing Sheets

(52) U.S. Cl.
CPC .............. *F16D 2500/3118* (2013.01); *F16D 2500/3144* (2013.01); *Y10T 477/75* (2015.01)

(56) References Cited

U.S. PATENT DOCUMENTS 8,414,449 B2 * 4/2013 Heap et al. .................. 477/5

2003/0043032 A1 3/2003 Jung

FOREIGN PATENT DOCUMENTS

| WO | WO 95/22014 A1 | 8/1995 |
| WO | WO 2008/036014 A1 | 3/2008 |
| WO | WO 2009/139698 A1 | 11/2009 |

* cited by examiner

METHOD AND SYSTEM FOR CONTROL OF A CLUTCH AT A VEHICLE

CROSS-REFERENCE TO RELATED APPLICATIONS

The present application is a 35 U.S.C. §§371 national phase conversion of PCT/SE2012/051431, filed Dec. 19, 2012, which claims priority of Swedish Patent Application No. 1151280-3, filed Dec. 28, 2011 and Swedish Patent Application No. 1251463-4, filed Dec. 19, 2012, the contents of which are incorporated by reference herein. The PCT International Application was published in the English language.

FIELD OF THE INVENTION

The present invention relates to a method for use with automatically operated clutches in vehicles, particularly a method for controlling a vehicle's clutch which is operated by a vehicle control disclosed herein. It relates also to a system and a vehicle and to a computer program and a computer program product which implement the method according to the invention.

BACKGROUND TO THE INVENTION

In vehicles in general, various different power train configurations occur, e.g. the gearbox may take the form of a manually operated gearbox or an automatic gearbox. It is often desirable for heavy vehicles to be drivable in as comfortable a way for the driver as possible, which usually entails the gear changes in the gearbox being effected automatically by means of the vehicle's control system. Gearboxes which change gear automatically have therefore also become increasingly usual in heavy vehicles.

This automatic gear changing is often effected in heavy vehicles by using control systems to effect gear changes in "manual" gearboxes (also called AMT, automated manual transmission), partly because they are substantially less expensive to make, but also because of their greater efficiency.

"Manual" gearboxes which change gear automatically are therefore usual in heavy vehicles largely used on motorways/national highways.

This gear changing may be effected in various different ways, one of which involves using a clutch automatically operated by the vehicle's control system for up/downshifts, in which case the driver only needs access to an accelerator pedal and a brake pedal.

In principle, the clutch need only be used to set the vehicle in motion from stationary, as other gear changes can be effected by the vehicle's control system without using the clutch at all, since they are instead effected "torque-free". It is also possible for the automatically operated clutch to be used for only certain gearchange steps or only in certain upshifts or downshifts.

For comfort reasons, however, the automatically operated clutch is in many cases used in all or substantially all upshifts and downshifts.

The efficiency of automatic gearboxes of the type often fitted in cars is far too low to be justified other than in, for example, urban buses and distribution vehicles in towns where the vehicles usually have frequently to come to a halt and then move off again.

It is however becoming increasingly common for even vehicles such as urban buses and distribution vehicles in towns to be provided with manual gearboxes operated by control systems instead of a conventional automatic gearbox.

Control of the automatically operated clutch is conducted by using the vehicle's control system to operate a clutch actuator which may for example consist of one or more pneumatically operated pistons which act upon a lever arm whereby the clutch is opened/closed by using said pistons to effect a lever arm movement. The clutch actuator may also be of an electrical type.

A manual clutch is normally activated less than the amount of use to which clutches/clutch actuators are subject during automatic operation by means of the vehicle's control system.

The vehicle's control system may for example allow slipping of the clutch over relatively long amounts of time, e.g. to achieve as comfortable a gear change as possible, or when moving off from stationary in a relatively high initial gear.

SUMMARY OF THE INVENTION

An object of the present invention is to propose a method for controlling a vehicle's clutch which is operated by a vehicle control system. This object is achieved with the method.

The present invention relates to a method for controlling a vehicle's clutch which is operated by a vehicle control system, where the vehicle is provided with an engine and a driver of the vehicle requests propulsive force from said engine. When a driver of said vehicle transmits a first propulsive force via said clutch, the method involves determining whether said clutch slips or not while transferring said first propulsive force. When said clutch slips during said transfer, the propulsive force transmitted by it is increased.

In propulsion terms, a vehicle with an automatically operated clutch behaves very largely in a similar way to a vehicle equipped with a conventional automatic gearbox. This means that a driver of a vehicle equipped with an automatically operated clutch is not certain to be aware of the type of vehicle being driven, and above all the vehicle will perhaps be driven in a way which wholly or largely corresponds to how it would be driven if it was actually equipped with a conventional automatic gearbox.

There are situations where driving with a conventional automatic gearbox is totally harmless from a wear perspective, but driving in similar situations a vehicle whose power train comprises an automatically operated clutch may be very harmful from a wear perspective. An example of where such situations may arise is when the vehicle is driven in such a way that the clutch is partly, but not fully, closed while a transfer of torque is taking place.

Said propulsive force may for example be requested by the vehicle's driver using an acceleration means which is operable by him/her, in which case the magnitude of the request for said propulsive force is controlled by said driver using said acceleration means.

In such situations, much of the power generated by the vehicle's engine may convert to friction heat, resulting in unacceptable wear. The present invention solves this problem by using the vehicle's control system in such situations to increase the propulsive force transmitted by said clutch, which may be achieved by using said vehicle control system to operate said clutch in such a way that a progressively larger proportion of the propulsive force delivered by the engine is transmitted via the clutch. This procedure will make the vehicle's driver aware of if the vehicle is beginning to move faster than expected, or beginning to move off from standstill, e.g. in situations where the driver requests just enough propulsive force to keep the vehicle just stationary, e.g. at a traffic light in an uphill situation.

The vehicle beginning to move in a way unexpected by the driver will either be allowed by him/her, in which case the clutch may close completely, or be prevented by him/her, e.g. by activating a brake system or discontinuing the request for propulsive force, in which case the clutch will open. In either case, further wear due to the clutch being partly open (slipping) is thus prevented.

Further characteristics of the present invention and advantages thereof are indicated by the detailed description of embodiment examples set out below and the attached drawings.

DETAILED DESCRIPTION OF PREFERRED EMBODIMENTS

Figure 1A:
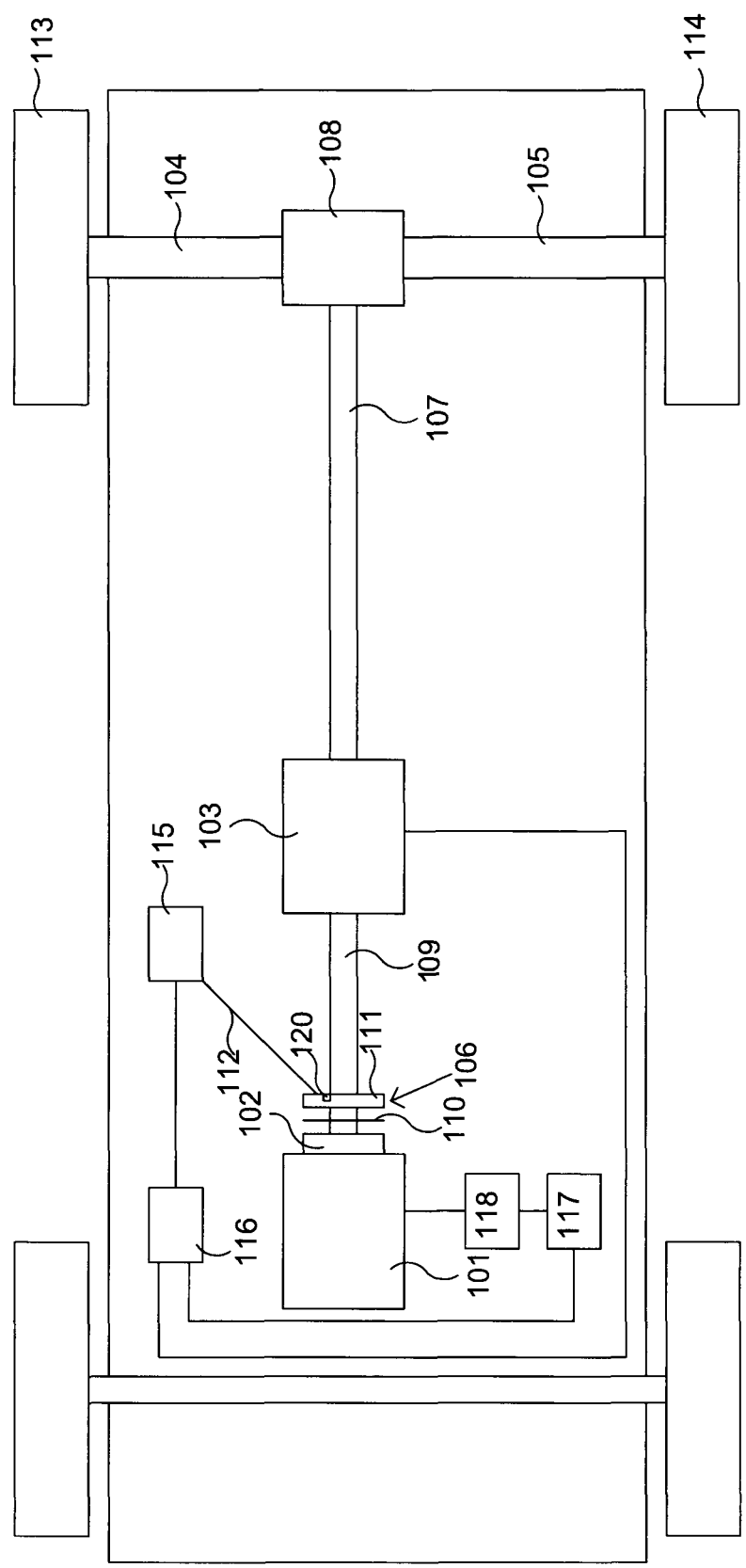
FIG. 1A depicts a power train of a vehicle with which the present invention may with advantage be employed.

FIG. 1A depicts schematically a power train of a vehicle 100 according to an embodiment of the present invention. The vehicle depicted has only one axle with tractive wheels 113, 114 but the invention is also applicable on vehicles in which more than one axle is provided with tractive wheels, and on vehicles with one or more further axles, e.g. one or more tag axles. The power train comprises a combustion engine 101 which in a conventional way, via an output shaft of the engine, usually via a flywheel 102, is connected to a gearbox 103 via a clutch 106.

The clutch 106 takes the form of an automatically operated clutch and in this embodiment is of a type in which a friction element (e.g. a disc) 110 connected to a first gearbox element, e.g. the gearbox input shaft 109, engages selectively with the engine's flywheel 102 to transmit propulsive force from the engine to the tractive wheels 113, 114 via the gearbox. The clutch may for example be of a dry-plate type. The engagement of the friction element 110 with the engine output shaft 102 is controlled by means of a pressure plate 111 which is movable sideways, e.g. by means of a lever arm 112, the function of which is controlled by a clutch actuator 115. The action of the clutch actuator upon the lever arm 112 is controlled by the vehicle's control system via a control unit 116.

A gearbox output shaft 107 then drives the tractive wheels 113, 114 via a final gear 108, e.g. a conventional differential, and driveshafts 104, 105 which are connected to said final gear.

From a driver perspective, as mentioned above, a vehicle with an automatically operated clutch behaves much like a vehicle equipped with a conventional automatic gearbox. As also mentioned, there are situations where driving a vehicle with an automatically operated clutch may cause a great deal of wear on the clutch if it is driven in the same way as a vehicle with a conventional automatic gearbox. Such situations apply in particular where the vehicle is stationary or almost stationary and is then driven in such a way that the clutch is partly closed while a transfer of torque is taking place, with the result that the engine output shaft will be running at a different (most usually higher) speed than the friction element 110 and hence the gearbox input shaft 109. In this situation the proportion of the power developed by the engine which is not transmitted to the vehicle's tractive wheels via the clutch will instead convert to heat released via the friction element 110. The more power converts to heat across the clutch, the greater will be the wear on the clutch, and in adverse situations the clutch wear may be very great, with premature wearing out of the friction element and also, in the worst case, of other components. The present invention proposes a method for reducing such problems.

Figure 2:
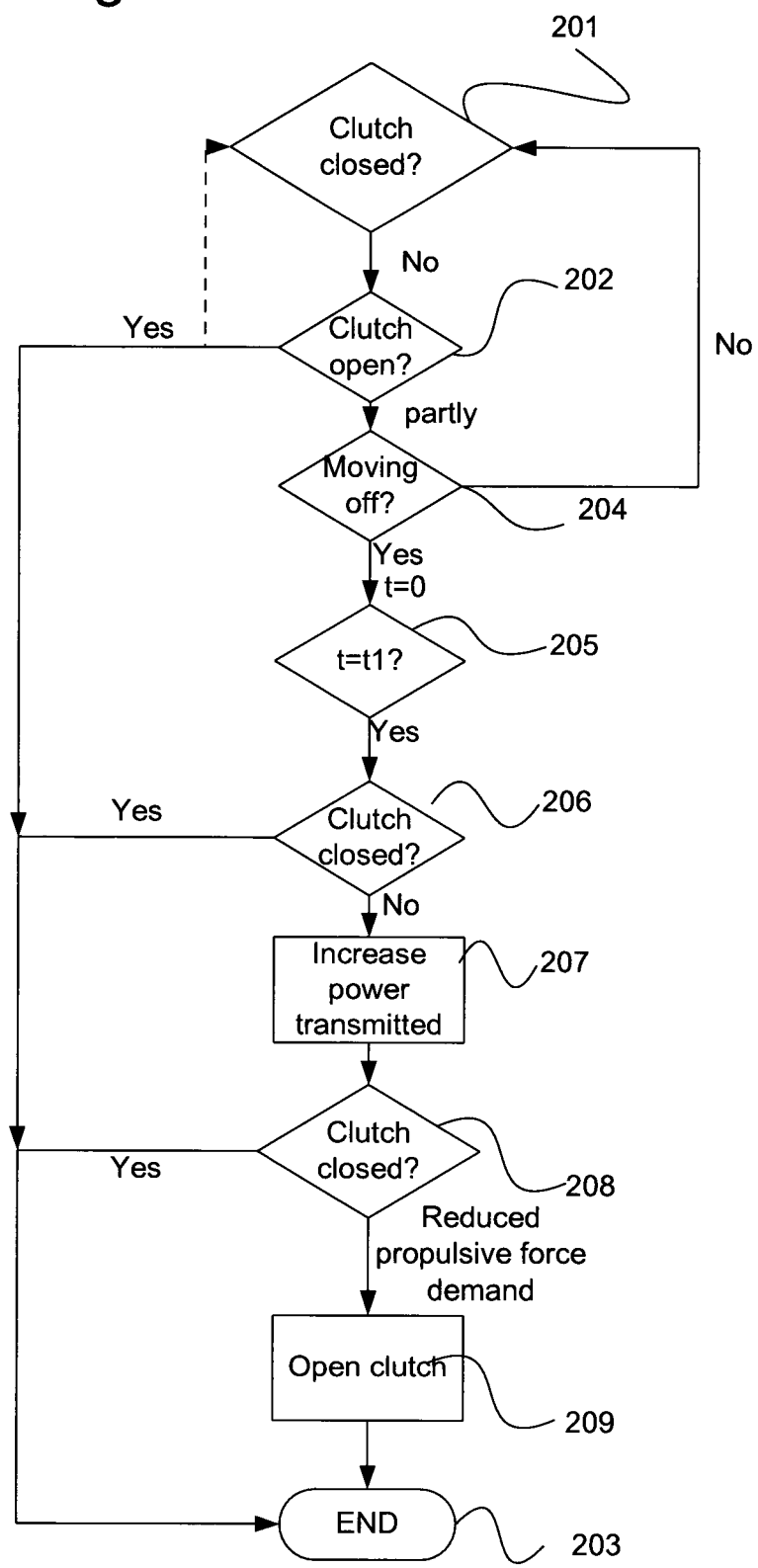
FIG. 2 depicts schematically a method according to an embodiment example of the present invention.

A method example 300 according to the present invention is illustrated in FIG. 2. The invention may be implemented in any suitable control unit, e.g. the control unit 117 depicted in FIG. 1A.

Control systems in modern vehicles usually comprise a communication bus system consisting of one or more communication buses to connect a number of electronic control units (ECUs), or controllers, to various components on board the vehicle. Such a control system may comprise a large number of control units, and taking care of a specific function may be shared between two or more of them.

For the sake of simplicity, FIG. 1A shows only control units 116, 117, 118, but one skilled in the art will appreciate that vehicles of the type here concerned often have significantly more control units.

Control unit 116 controls the clutch 106 (the clutch actuator 105) and also the gearbox 103. In the embodiment depicted, the present invention is implemented in control unit 117, which may be a control unit dedicated for the present invention, but the present invention might also be implemented wholly or partly in one or more other control units with which the vehicle is already provided, e.g. control unit 116 and/or control unit 118 which here controls the vehicle's engine 101.

The control exercised by control unit 117 (or the control unit or units with the present invention is implemented) over the clutch 106 (via control unit 116) according to the present invention is also likely to depend on signals received from control unit 116 and from the control unit or units which control engine functions, i.e. in the present case control unit 118. Control unit 117 will probably also receive signals from undepicted other control units with which the vehicle is provided, and/or information from, for example, various sensors and the like with which the vehicle is provided. Control units of the type here concerned are usually arranged to receive sensor signals from different parts of the vehicle. Control unit 116 may for example receive sensor signals representing the position of the friction element and/or the lever arm. Control unit 116 may further receive signals representing respective rotation speeds of the engine output shaft and the gearbox input shaft, making it possible to determine a rotation difference across the clutch, so-called clutch slip.

Control units of the type here concerned are also usually arranged to deliver control signals to various parts and components of the vehicle. In the present example, control unit 117 for example delivers signals to control unit 116 to request/order operation of the clutch according to the invention as below.

Control is often governed by programmed instructions, typically in the form of a computer program which, when executed in a computer or control unit, causes the computer/control unit to effect desired forms of control action, e.g. method steps according to the present invention. The computer program is usually part of a computer program product which is stored on a suitable non-transitory storage medium 121 (see FIG. 1B), which may take the form of any from among ROM (read-only memory), PROM (programmable read-only memory), EPROM (erasable PROM), flash memory, EEPROM (electrically erasable PROM), a hard disc unit etc., and be situated in or in communication with the control unit, in which case the computer program will be executed by the control unit. The vehicle's behavior in a specific situation is therefore modifiable by altering the computer program's instructions.

Figure 1B:
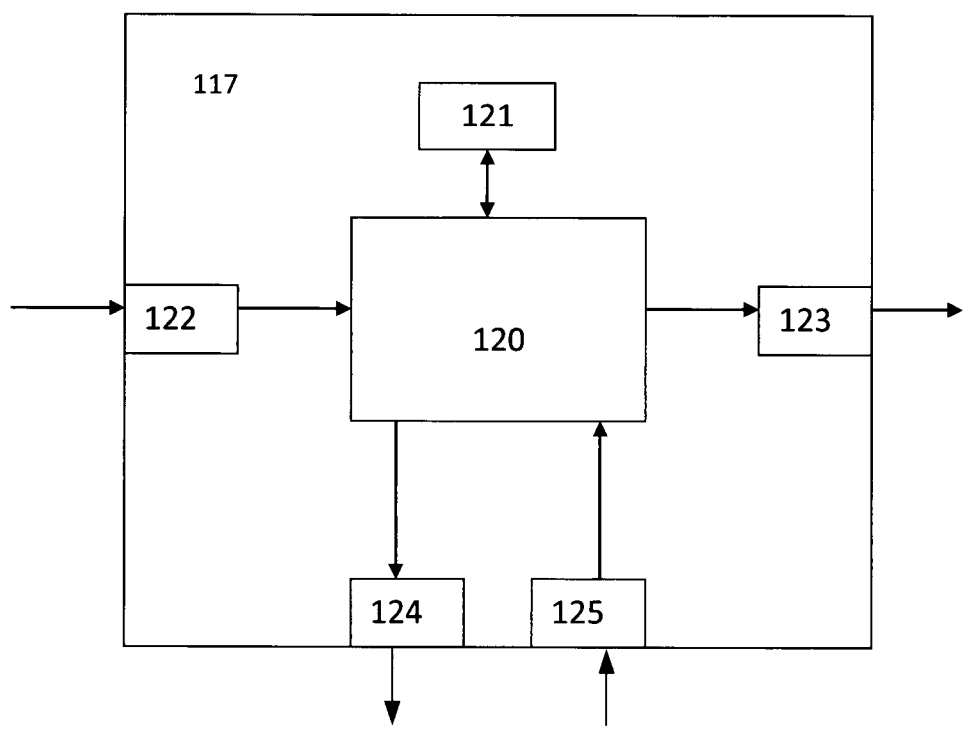
FIG. 1B depicts a control unit in a vehicle control system.

A control unit example (control unit 117) depicted schematically in FIG. 1B may comprise a calculation unit 120 which may for example take the form of any suitable kind of processor or microcomputer, e.g. a circuit for digital signal processing (Digital Signal Processor, DSP), or a circuit with a predetermined specific function (Application Specific Integrated Circuit, ASIC). The calculation unit is connected to a memory unit 121 which provides it with, for example, the stored program code and/or the stored data which the calculation unit needs to enable it to perform calculations. The calculation unit is also arranged to store partial or final results of calculations in the memory unit 121.

Control unit 117 is further provided with respective devices 122, 123, 124, 125 for receiving and sending input and output signals. These signals may comprise waveforms, pulses or other attributes which the input signal receiving devices 122, 125 can detect as information for processing by the calculation unit 120. The output signal sending devices 123, 124 are arranged to convert calculation results from the calculation unit to output signals for conveying to other parts of the vehicle's control system and/or the component or components for which they are intended. Each of the connections to the respective devices for receiving and sending input and output signals may take the form of one or more from among a cable, a data bus, e.g. a CAN (Controller Area Network) bus, a MOST (Media Oriented Systems Transport) bus or some other bus configuration, or a wireless connection.

Reverting to FIG. 2, step 201 determines whether the clutch is closed. So long as the clutch is closed, the method stays at step 201, but if it is not closed the method moves on to step 202. This determination may for example be done by control unit 116 comparing the rotation speeds on the respective sides of the clutch as below.

Step 202 determines whether the clutch is fully open, in which case the friction element will be completely free from the engine's flywheel 102. This may for example be done by determining a position of the friction element (the lever arm). If such is the case, no transfer of torque takes place across the clutch, so no friction losses occur. According to the present invention, the method therefore ends by moving on to step 203 when the clutch is open. It may alternatively go back to step 201 for another determination of whether the clutch is closed or not (indicated by broken line).

If step 202 determines that the clutch is only partly open, the method moves on to step 204. Whether the clutch is partly open may for example be determined by determining a rotation speed $n_{v1}$ of the gearbox input shaft, which is then compared with the engine's rotation speed $n_m$. If there is a difference between them, the clutch is at least partly open.

Whether the clutch is partly open may also for example be determined on the basis of the position of the lever arm. The physical position at which the friction element just contacts the flywheel and can therefore begin to transmit torque between the engine and the rest of the power train is called the contact point.

On vehicles of the type here concerned, the control system usually causes an estimate of this contact point to be made at regular intervals (there are various prior art examples of how this contact point determination may be done), making it possible for the control system to have a good idea of the position of the contact point. By comparing the current position of the lever arm relative to the contact point it is therefore also possible to determine whether the lever arm is at a position between the contact point and clutch closed, in which case the clutch is partly open. The contact point may take the form of any suitable representation of the physical position of the friction element when it just contacts the flywheel, e.g. the position of the lever arm and/or the clutch actuator when the friction element just contacts the flywheel. Whether the clutch is partly open may also be determined in some other suitable way.

The clutch being partly open may be due to various different causes, e.g. the vehicle may be in the midst of a change from one gear to another. In such situations, opening/closing of the clutch normally takes place in a fully controlled way, causing no more wear than normally occurs when changing gear. Step 204 therefore determines whether the clutch is partly open because the vehicle is moving off.

This may for example be done by determining whether the engine's rotation speed $n_m$ is greater than the rotation speed $n_{v1}$ of the gearbox input shaft. If such is the case, the vehicle's running speed $V_F$ will thus be lower than it would be with the clutch closed at prevailing engine speed, which indicates that the vehicle's running speed is intended to increase, e.g. from stationary, in which case the vehicle is regarded as moving off (thus the vehicle need not necessarily be completely stationary for it to be regarded as moving off, although in one embodiment this may be a requirement). In one embodiment this determination only serves as an indication that the vehicle is moving off.

In another embodiment said rotation speeds are used in conjunction with further control system data to determine whether the vehicle is regarded as moving off. In one embodiment, data concerning the vehicle's running speed $V_F$ may be combined with said rotation speeds, in which case moving off may for example be regarded as likely if $n_{v1}$ is lower than $n_m$ while at the same time $V_F$ is below some appropriate level. One embodiment uses only the determination of whether $n_m$ is greater than $n_{v1}$ for moving off to be regarded as taking place according to the present invention, and one embodiment also determines whether $n_{v1}$ is below some appropriate level or the gearbox input shaft is alternatively not rotating at all in the engine's direction of rotation. So long as the criterion at step 204 is not fulfilled, the method goes back to step 201.

One embodiment determines at step 204 whether the vehicle's running speed $V_F$ is below a first level $V_1$ which may for example be set at or above the lowest speed at which the vehicle can move when the lowest gear is engaged and the clutch is closed. So long as the vehicle's prevailing running speed $V_F$ is above this first level $V_1$, the reason for the clutch being open is regarded as being that a gear change is taking place. Here again, the method therefore goes back in one embodiment to step 201 for another determination.

One embodiment determines not only whether the vehicle's prevailing running speed $V_F$ is above the level which applies in the lowest gear when the clutch is closed. It determines instead whether $V_F$ is above the lowest speed of the current gear or at least of the nearest gear below the current gear, so $V_1$ may instead be set to such a value. One reason for this is that an initial gear chosen by the vehicle's driver might be not the lowest gear but a gear which is one or more gearsteps higher to avoid frequent gear changes when the vehicle is moving off. In such cases it is therefore not sufficient for $V_F$ to be greater than the speed of the lowest gear when the clutch is closed, since it needs to be greater than a higher speed to enable the clutch to be open because of gear change and not for some other reason.

If step 204 determines that the vehicle is regarded as moving off, the method therefore moves on to step 205 at which in this embodiment it waits for a first amount of time t1 before moving on to step 206 to check whether the clutch is closed. Time t1 may for example be set at an amount within which it is normally possible for gear changing to be completed, and it may also for example be different for different gearchange steps. It may also be any suitable amount of time for which the driver allows slipping of the clutch, e.g. 1 second, 2 seconds, 3 seconds or some other suitable period. If the clutch is closed when the method reaches step 206, i.e. after time t1, the method ends at step 203. Alternatively, it goes back to step 201. If conversely the clutch is still not closed after time t1, it may be assumed that the clutch is partly open for some other reason, in which case the method moves on instead to step 207. When it reaches step 207 it may thus be assumed that the clutch is partly open when a transfer of propulsive force takes place, resulting in undesirable energy loss in the form of heat which may cause undesirable wear.

As mentioned above, this clutch slipping may be due to the vehicle being stationary on an upgrade where instead of keeping it stationary by activating the service brake system, e.g. by depressing a brake pedal, the driver keeps it stationary by using an acceleration means such as an acceleration control, e.g. an accelerator pedal, to request just enough propulsive force from the engine to ensure that the propulsive force on the tractive wheels just matches prevailing running resistance. In this situation, the engine output shaft will therefore rotate at prevailing engine speed, while the gearbox input shaft 109 and hence the friction element 110 will be motionless. In this situation a large or very large speed difference thus prevails between the friction element 110 and the flywheel 102, which also means that a large or very large proportion of the propulsive force generated by the engine (the torque generated) will convert to friction heat instead of contributing to the vehicle's propulsion. The greater the amount of energy consumed by friction, the more the wear to which the clutch (the friction element) will be subject. The clutch might also be partly open because the driver is for example inching in a queue at below the vehicle's lowest speed in a lowest or chosen gear.

In a similar situation with a conventional automatic gearbox, the torque converter takes care of the surplus energy, e.g. by pumping oil round, causing no harmful wear.

With the object of stopping undesirable energy conversion via friction, step 207 therefore initiates an increase in the power transmitted by the clutch, which is preferably achieved by the propulsive force transmitted by it being increased by using the control system to operate the clutch in such a way that a larger propulsive force is transmitted, i.e. the friction between the friction element and, for example, the flywheel is increased, e.g. by the friction element being moved towards the flywheel, thereby increasing the transmissible power and thus also causing a larger proportion of the power delivered by the engine to be transmitted via the clutch to the power train downstream instead of being consumed as friction energy.

The increase in power transfer across the clutch may be conducted in any suitable way, e.g. it might be linear, in which case the increase in power transmitted per unit time might be constant. The present invention does however make the increase in power transmitted per unit time non-linear so that the increase changes progressively as the propulsive force transmitted by the clutch changes.

The increase in the power transfer may for example take the form of a function which increases continuously or stepwise, e.g. an exponential function or some other suitable non-linear function whereby the propulsive force transmitted by the clutch increases at an ever higher rate per unit time progressively as the clutch closes. In one embodiment the power transfer thus increases slowly at first before subsequently increasing ever more quickly, e.g. until a certain maximum increase per unit time is reached. The increase in the propulsive force transmissible by the clutch may for example be controlled so that said maximum increase per unit time is below some appropriate value to ensure that the change in vehicle speed does not become too great and cause the driver unnecessary surprise. The increase may for example be controlled by some suitable calculation model.

The initially slow increase affords the advantage of giving the driver time for example to react when the increased propulsive force transfer causes the vehicle to begin to move in a situation where he/she expects it to be stationary. The increase activated at step 207, i.e. the rate at which the clutch closes, needs to be such that the driver has time to react when the vehicle's speed changes, with the object of preventing risk of dangerous situations arising because the clutch closes too quickly.

Instead of the increase in the propulsive force transmitted by the clutch taking place at an ever increasing rate progressively as the clutch closes, the increase per unit time might conversely be greatest initially before subsequently decreasing. This solution affords the advantage that the driver will quickly become aware of what is about to happen, and the increase in the propulsive force per unit time may then decrease to avoid risk of too powerful vehicle movement before it is possible for the driver to react. In this case the increase in the propulsive force per unit time may be reduced to some appropriate level which may for example be less than the greatest increase per unit time which is applied when the propulsive force transmitted by the clutch increases at an ever faster rate per unit time when the clutch is closing. The increase per unit time which in this embodiment is applied at the beginning of the increase in the propulsive force transmitted by the clutch might also be the same as or greater or smaller than the greatest increase per unit time applied when the propulsive force transmitted by the clutch increases at an ever faster rate per unit time when the clutch is closing.

Figure 3:
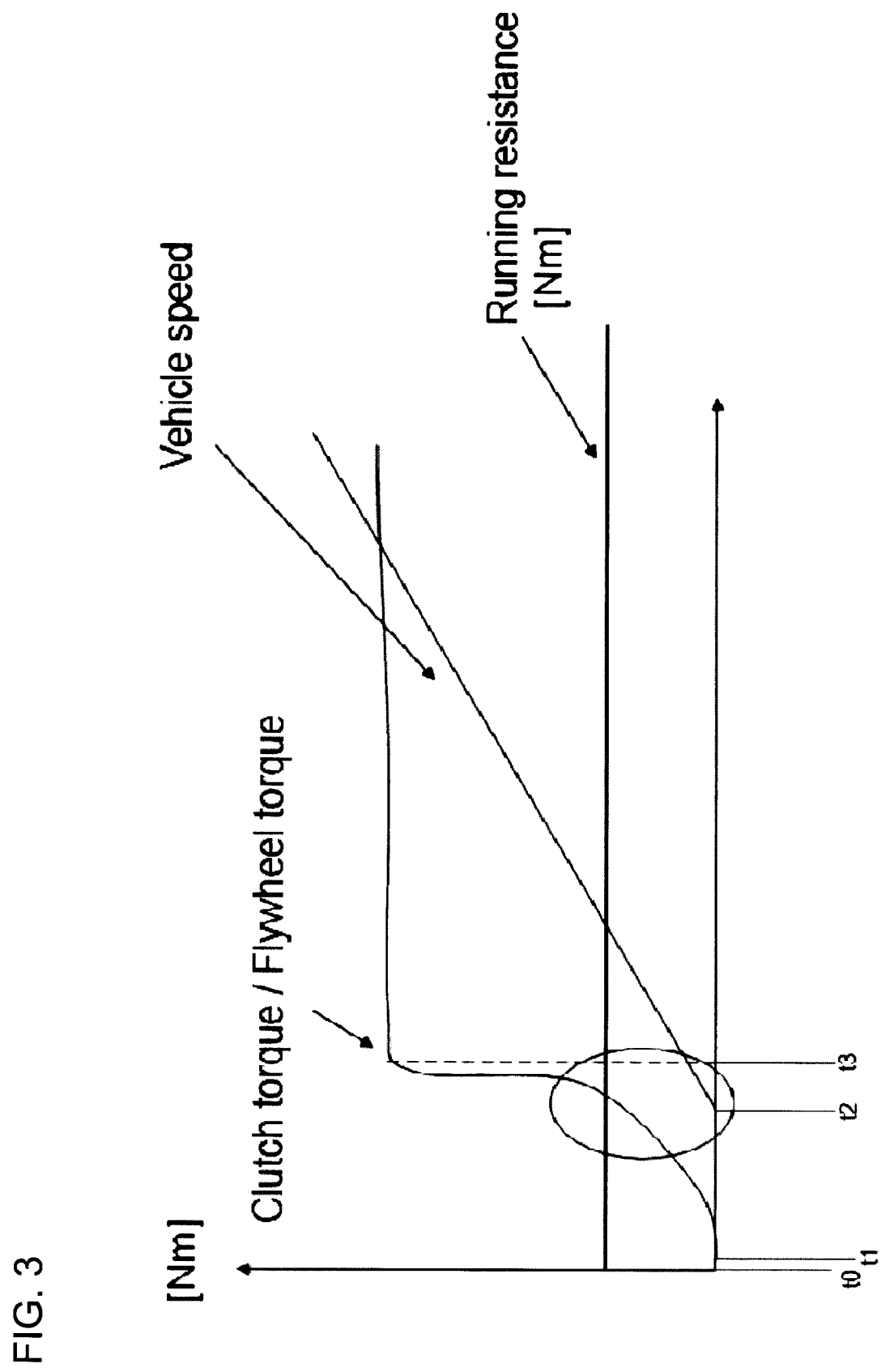
FIG. 3 depicts an example of an increase in the propulsive force transmitted by the clutch over time.

An example of an increase according to the invention in the power transfer is depicted in FIG. 3, in which the power transmitted by the clutch is plotted against time. It shows also the prevailing running resistance and the vehicle's running speed. The method begins at time t=t0, and the increase in the power transmitted by the clutch begins at t=t1. As may be seen, the power transmitted increases slowly at first before subsequently increasing exponentially. At t=t2 the power transmitted reaches the vehicle's running resistance as below, whereupon the vehicle begins to move, indicated by its increasing running speed $V_F$.

As may be seen in the diagram, the propulsive force transmitted by the clutch is equal to the vehicle's running resistance at time t=t2. Until that time, the vehicle will therefore not yet begin to move. In one embodiment, a first for example linear or other suitable increase is therefore applied until the power transmitted reaches the vehicle's running resistance, i.e. the situation at t=t2. From that time onwards the propulsive force may then be arranged to change in a non-linear way as above, e.g. at a faster rate per unit time, progressively as the clutch closes.

The increase per unit time may also be arranged to take place until it reaches some appropriate maximum value, again with the object of preventing too fast vehicle movements. It may also be arranged to first rise to some appropriate value and thereafter begin to decline.

As well as knowledge of said contact point, the control system also normally has knowledge of the characteristic of the clutch, i.e. how much power can be transmitted relative to the position of the friction element, making it possible for an increase in the power transmitted in the example depicted in FIG. 3 to also take place in practice with a good match with the expected increase.

In control according to the invention, any suitable representation of the propulsive force transmitted by the clutch may generally be employed, e.g. a representation of the position of the clutch (position of the lever arm), which on the basis of the characteristic of the clutch may also be used to determine a representation of propulsive force transmitted.

When an increase in the power transmitted by the clutch has begun at step 207, the method moves on to step 208 to determine whether the clutch is closed, e.g. by comparing the rotation speeds on the respective sides of the clutch or by determining whether the vehicle's running speed is greater than the lowest possible speed in the current gear when the clutch is closed. One embodiment determines whether the vehicle's speed is greater than the lowest possible speed in the current gear at the current engine speed when the clutch is closed. If the vehicle's running speed is equal to or greater than this speed, or if "clutch closed" is indicated in some other way, t=t3 in FIG. 3, the method is halted and ends at step 203, or goes back to step 201, since the clutch has closed and the risk of unacceptable wear has thus been prevented. Whether the clutch is closed or not may also be determined for example on the basis of the position of the clutch (position of the lever arm).

So long as the clutch is not closed, the method goes back to step 207 for further increase, by closure of the clutch, in the power transmitted by it.

Determining an increase in the propulsive force at step 207 may also involve using the vehicle's running resistance. Estimating the vehicle's running resistance, i.e. the force on its tractive wheels which has to be overcome to enable a change in its running speed to take place (indicated in FIG. 3), which may be conducted in any of the various suitable ways described in prior art, and comparing the estimated running resistance with the propulsive force on the vehicle's tractive wheels which corresponds to the power transmitted by the clutch, makes it possible to determine how much power needs to be transmitted by the clutch to enable the vehicle to begin to move in the direction of travel. So long as the power transmitted by the clutch is less than that required on the tractive wheels, the propulsive force transmitted by it may be increased so that the propulsive force acting upon the tractive wheels definitely overcomes said running resistance, e.g. to some appropriate extent, so the driver will certainly become aware.

At step 208, further determinations may also be made. It is for example possible to monitor whether the vehicle's driver is still requesting positive propulsive force, e.g. by means of an accelerator pedal. If he/she no longer requests positive propulsive force, e.g. because of having raised his/her foot from the accelerator pedal and/or having activated a brake system, e.g. the vehicle's service brake system, the method moves on to step 209 to immediately open the clutch, since the driver has requested a decrease in the propulsive force. In other words, the propulsive force transmitted by the clutch is only increased progressively by closure of the clutch so long as the propulsive force requested by the driver does not decrease or cease.

The method then ends at step 203 or goes back to step 201 for another determination.

The present invention thus proposes a method which closes the clutch when it is partly open. This means that if the vehicle is stationary when the closure of the clutch begins it will begin to move forwards "of its own accord", which the driver will either allow, in which case the clutch closes, or will counteract, e.g. by releasing an accelerator pedal or activating a brake system, e.g. by pressing a brake pedal. Irrespective of which course the driver takes, the clutch will thus be fully opened or closed, potentially reducing harmful wear. The invention also results in the vehicle (the clutch) being subject to more uniform wear irrespective of which driver drives it, since slipping of the clutch is not allowed for longer periods of time, thus levelling out differences in driving style between different drivers.

In one embodiment further determinations are also made at step 208. For example, a representation of the grip of at least one tractive wheel on the running surface may be determined, e.g. by comparing the rotation speed of the tractive wheel or wheels with the vehicle's running speed. If the speed difference is greater than some appropriate value, thereby indicating that at least one tractive wheel is slipping because of impaired grip on the running surface, e.g. because of snow, ice or loose gravel, the increase in the propulsive force transmitted by the clutch may be halted to avoid causing difficulties for a driver, e.g. when trying to manoeuvre the vehicle in a situation of poor grip on the running surface.

The invention is also applicable both in gear changes for travelling forwards and those for reversing the vehicle. It may however in certain situations be advantageous to only activate the invention for travel in a forward direction in order to reduce for example the risk of colliding with obstacles behind when reversing. It may also be advantageous for it to be possible for the function according to the invention to be for example selectively switched off during certain manoeuvring, e.g. when driving the vehicle in a marshalling or manoeuvring mode in which the driver often drives at very low speed, e.g. when berthing at a loading bay or in a confined parking location.

Moreover, the invention is exemplified above for a situation where the driver requests propulsive force via an acceleration means controllable by him/her, e.g. an accelerator pedal. The invention is however also applicable where the driver requests propulsive force in some other way, e.g. via some driver assistance system or suitable control unit.

Further embodiments of the method and the system according to the invention are referred to in the attached claims. It should also be noted that the system may be modified in different embodiments of the method according to the invention (and vice versa) and that the present invention is therefore in no way restricted to the embodiments described above of the method according to the invention, but relates to and comprises all embodiments within the protective scope of the attached independent claims.

The invention claimed is:

1. A method for controlling a clutch, of a vehicle gear transmission:
   wherein the vehicle is provided with an engine, and a driver of the vehicle requests a propulsive force be provided from the engine;
   the method comprising:
   operating the clutch by the vehicle control system which is configured for:
   transmitting a first propulsive force requested by the driver via the clutch;
   determining whether the clutch slips when transmitting the first propulsive force;

when the clutch slips during the transmission of the first propulsive force, increasing the propulsive force transmitted by the clutch; and controlling the increase in the propulsive force transmitted by the clutch so that an increase per unit time changes based on a representation of the propulsive force transmitted by the clutch.

2. A method according to claim 1, further comprising:
controlling the increase in the propulsive force transmitted by the clutch so that the increase in the force per unit time is increased based on the representation of the propulsive force transmitted by the clutch.

3. A method according to claim 1, further comprising increasing the force per unit time as the transmitted propulsive force is increased.

4. A method according to claim 1, further comprising decreasing the force per unit time as the transmitted propulsive force is increased.

5. A method according to claim 1, further comprising controlling the propulsive force transmitted by clutch so that the increase of the propulsive force per unit time is non-linear.

6. A method according to claim 1, further comprising controlling the propulsive force transmitted by the clutch so that the increase in the propulsive force per unit time is a function which is increased continuously/stepwise.

7. A method according to claim 1, further comprising controlling the propulsive force transmitted by the clutch so that the increase in the propulsive force per unit time is increased based on the propulsive force transmitted by the clutch until a first increase per unit time is reached.

8. A method according to claim 1, further comprising:
during the increase in the propulsive force transmitted by the clutch, controlling the increase such that the increase per unit time is greatest at the beginning of the increase in the propulsive force transmitted by the clutch; and controlling the propulsive force transmitted by the clutch so that the increase per unit time takes the form of a function which decreases continuously/stepwise.

9. A method according to claim 1, further comprising:
during the increase in the propulsive force transmitted by the clutch, controlling the increase such that the increase per unit time is greatest at the beginning of the increase in the propulsive force transmitted by said clutch; and controlling the propulsive force transmitted by the clutch so that the increase per unit time is decreased with increased propulsive force until a second increase per unit time is reached.

10. A method according to claim 1, wherein the vehicle is further provided with at least one acceleration device controllable by a driver for requesting a selected propulsive force from the engine, wherein the propulsive force request is controlled by the driver using an acceleration device of the engine.

11. A method according to claim 1, further comprising increasing the propulsive force transmitted by the clutch by using the vehicle control system to operate the clutch such that the propulsive force transmitted by the clutch is increased.

12. A method according to claim 1, further comprising determining whether the vehicle is moving off.

13. A method according to claim 1, further comprising determining whether the speed ($V_F$) of the vehicle is below a first level ($V_1$); and then increasing the propulsive force transmitted by the clutch when the vehicle's speed ($V_F$) is below the first level ($V_1$).

14. A method according to claim 1, wherein the vehicle further comprises a gearbox;
the method further comprising:
increasing the propulsive force transmitted by the clutch when a rotation speed ($n_m$) of the engine exceeds a rotation speed ($n_{v1}$) of an input shaft of the gearbox.

15. A method according to claim 14, further comprising increasing the propulsive force transmitted by the clutch when a rotation speed ($n_{v1}$) of the input shaft of the gearbox is below a first rotation speed.

16. A method according to claim 1, further comprising:
determining a running resistance of the vehicle; and
when the propulsive force transmitted by the clutch corresponds to a propulsive force acting upon tractive wheels of the vehicle which is less than a running resistance, then increasing the propulsive force transmitted by the clutch so that the propulsive force acting upon the tractive wheels of the vehicle overcomes the running resistance.

17. A method according to claim 1, further comprising controlling the increase in the propulsive force transmitted by the clutch so that the increase per unit time is below a first value.

18. A method according to claim 1, wherein the increase in the propulsive force transmitted by the clutch is performed according to a computational algorithm.

19. A method according to claim 1, wherein when the clutch slips during the transmission of the first propulsive force; and
increasing the propulsive force transmitted by the clutch after a first amount of time has elapsed.

20. A method according to claim 19, further comprising incrementing the first time to begin when a propulsive force is requested.

21. A method according to claim 1, further comprising determining whether the propulsive force requested by the driver is decreasing; and
increasing the propulsive force transmitted by the clutch as long as the propulsive force requested by the driver does not decrease.

22. A method according to claim 1, further comprising increasing the propulsive force transmitted by the clutch as long as the clutch is slipping.

23. A method according to claim 1, further comprising interrupting the increase in the propulsive force transmitted by the clutch when the propulsive force request is interrupted.

24. A method according to claim 1, further comprising after an increase in the propulsive force transmitted by the clutch, fully opening the clutch in response to a decrease in the propulsive force requested by the driver.

25. A method according to claim 1, where the vehicle comprises at least one tractive wheel, the method further comprising:
determining a representation of a grip of the at least one tractive wheel on a running surface on which the vehicle is running; and
interrupting the increase in the propulsive force transmitted by the clutch if the grip on the running surface is less than a first grip.

26. A method according to claim 25, further comprising the determination of a representation of the grip of at least one tractive wheel on the running surface comprises determining whether the rotation speed of the tractive wheel on the running surface corresponds to a vehicle running speed ($V_F$) which is greater than a prevailing vehicle running speed ($V_F$) by more than a first speed.

27. A computer programme product comprising a non-transitory computer-readable medium which stores a computer program code such that when the code is executed in a computer, it causes the computer to perform the method according to claim 1.

28. A system for controlling a clutch which pertains to a vehicle, wherein the vehicle is provided with an engine operable for driving the clutch when a driver requests propulsive force from the engine;
the system comprises:
a vehicle control system configured for operating the clutch, the control system comprising:
a determining device configured for determining whether the clutch slips when transmitting the first propulsive force; and
when the determining device determines that the clutch slips during the transmission of the first propulsive force, the control system for the engine and for the clutch being configured for increasing the propulsive force transmitted by the clutch;
a control unit for controlling the increase in the propulsive force transmitted by the clutch such that the increase per unit time changes on a basis of a representation of the propulsive force transmitted by the clutch.

29. A system according to claim 28, further comprising:
the clutch comprises a first clutch element and a second opposing clutch element, wherein the first clutch element is configured and operable to drive the second clutch element;
the first clutch element being firmly connected to the engine; and
the first and second clutch elements being configured to be selectively connected to each other to transmit propulsive force from the engine to the second clutch element via the first clutch element.

30. A system according to claim 29, wherein the clutch slips when a difference in rotation speed prevails between the first and second clutch elements.

31. A vehicle provided with a system according to claim 28.

32. A vehicle according to claim 31, further provided with at least one acceleration device controllable by a driver of the vehicle and configured for requesting propulsive force from the engine, wherein the propulsive force request is controlled by the driver using the acceleration device.

* * * * *